(12) United States Patent
Yoon et al.

(10) Patent No.: US 11,999,927 B2
(45) Date of Patent: Jun. 4, 2024

(54) BEVERAGE MAKER

(71) Applicant: LG ELECTRONICS INC., Seoul (KR)

(72) Inventors: Shic Yoon, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 787 days.

(21) Appl. No.: 16/509,565

(22) Filed: Jul. 12, 2019

(65) Prior Publication Data
US 2020/0017809 A1 Jan. 16, 2020

(30) Foreign Application Priority Data

Jul. 12, 2018 (KR) .......................... 10-2018-0080988

(51) Int. Cl.
| | | |
|---|---|---|
| C12C 13/10 | (2006.01) | |
| B67D 1/12 | (2006.01) | |
| C12C 11/00 | (2006.01) | |

(52) U.S. Cl.
CPC ............ C12C 13/10 (2013.01); B67D 1/1202 (2013.01); C12C 11/006 (2013.01)

(58) Field of Classification Search
CPC .... C12C 13/10; C12C 11/006; A47J 31/4403; A47J 31/40; A47J 31/407; A47J 31/462; A47J 31/468
USPC .......................................................... 99/276
See application file for complete search history.

(56) References Cited

U.S. PATENT DOCUMENTS

| | | | |
|---|---|---|---|
| 7,398,726 B2* | 7/2008 | Streeter ................... | A47J 31/56 99/305 |
| 2011/0061534 A1 | 3/2011 | Ozanne et al. | |
| 2014/0017354 A1* | 1/2014 | Joseph ..................... | C12C 7/04 99/278 |

FOREIGN PATENT DOCUMENTS

| | | |
|---|---|---|
| JP | 3138147 | 12/2007 |
| JP | 2008-175040 | 7/2008 |
| JP | 2011-519644 | 7/2011 |
| KR | 10-2001-0056531 | 7/2001 |
| KR | 10-2018-0065551 | 6/2018 |
| KR | 20180065551 A * | 6/2018 |

OTHER PUBLICATIONS

March 809/815 manual, 2017 (Year: 2017).*
http://www.homebrewing.com/articles/building-better-pumps/, May 2018(hereafter Homebrewing) (Year: 2018).*
http://www.theelectricbrewery.com/pumps, Mar. 2018 (hereafter The electric brewery (Year: 2018).*
Korean Office Action dated Jul. 13, 2023 issued in Application No. 10-2018-0080988.

* cited by examiner

*Primary Examiner* — Nathaniel E Wiehe
*Assistant Examiner* — Alba T Rosario-Aponte
(74) *Attorney, Agent, or Firm* — KED & ASSOCIATES, LLP

(57) ABSTRACT

A beverage maker may include a water tank storing water; a water supply pump provided below the water tank to receive water from the water tank, a water supply channel connected to the water supply pump to guide water discharged from the water supply pump, an air removing channel connected to the water supply channel, an air removing valve or cap connected to the air removing channel, and a controller maintaining the water supply pump in an off state when the air removing valve is opened.

20 Claims, 11 Drawing Sheets

BEVERAGE MAKER

CROSS-REFERENCE TO RELATED APPLICATION(S)

This application claims priority under 35 U.S.C. § 119 to Korean Application No. 10-2018-0080988 filed in Korea on Jul. 12, 2018, whose entire disclosure is hereby incorporated by reference.

BACKGROUND

1. Field

A beverage maker including a water supply pump is disclosed herein.

2. Background

Beverages may be collectively referred to as drinkable liquids such as alcohol, tea, etc. Beverages may be classified into various categories such as thirst quenching drinks like water, drinks having a unique flavor or extracted from plants such as tea, juice, or fruit drinks, refreshing beverages such as carbonated soft drinks, caffeinated drinks such as coffee, or alcoholic beverages such as beer or cocktails.

Beer is an alcoholic beverage produced with malt made by sprouting barley to make juice, wort, or liquid extract, filtering the liquid extract, adding hops, and fermenting the liquid extract using yeast. Consumers may purchase ready-made products manufactured and sold by a beer maker, or may brew a house beer (i.e., a handmade beer) by directly fermenting beer ingredients at home or in a bar.

A large variety of types of house beer may be produced as compared with ready-made beer products, as house beer may be custom-made to suit consumer tastes. Ingredients used to make beer may include water, malt, hops, yeast (or leaven), scent or flavor additives, etc. Yeast may ferment the malt to produce alcohol and carbonic acid. The flavor additives, such as fruit, syrup, or vanilla beans, may enhance a taste of the beer.

Generally, the brewing process for house beer may have three steps or stages: a wort production step, a fermentation step, and an aging, ripening, or maturation step. The entire brewing process may take about two to three weeks. It is important that house beer is maintained at an optimal temperature during fermentation.

Simpler production or manufacturing processes of house beer are generally more convenient for beer producers and consumers. Recently, consumers have started using beverage makers or beverage making apparatuses to easily brew house beer at home or at a bar. Such a beverage maker should safely and easily make beer.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, specific embodiments of the present invention will be described in detail with reference to the drawings.

Hereinafter, beer is described as an example of a beverage manufactured using a beverage maker, but beverages that may be produced using the beverage maker are not limited to beer. Various types of beverages may be produced through the beverage maker according to an embodiment.

Figure 1:
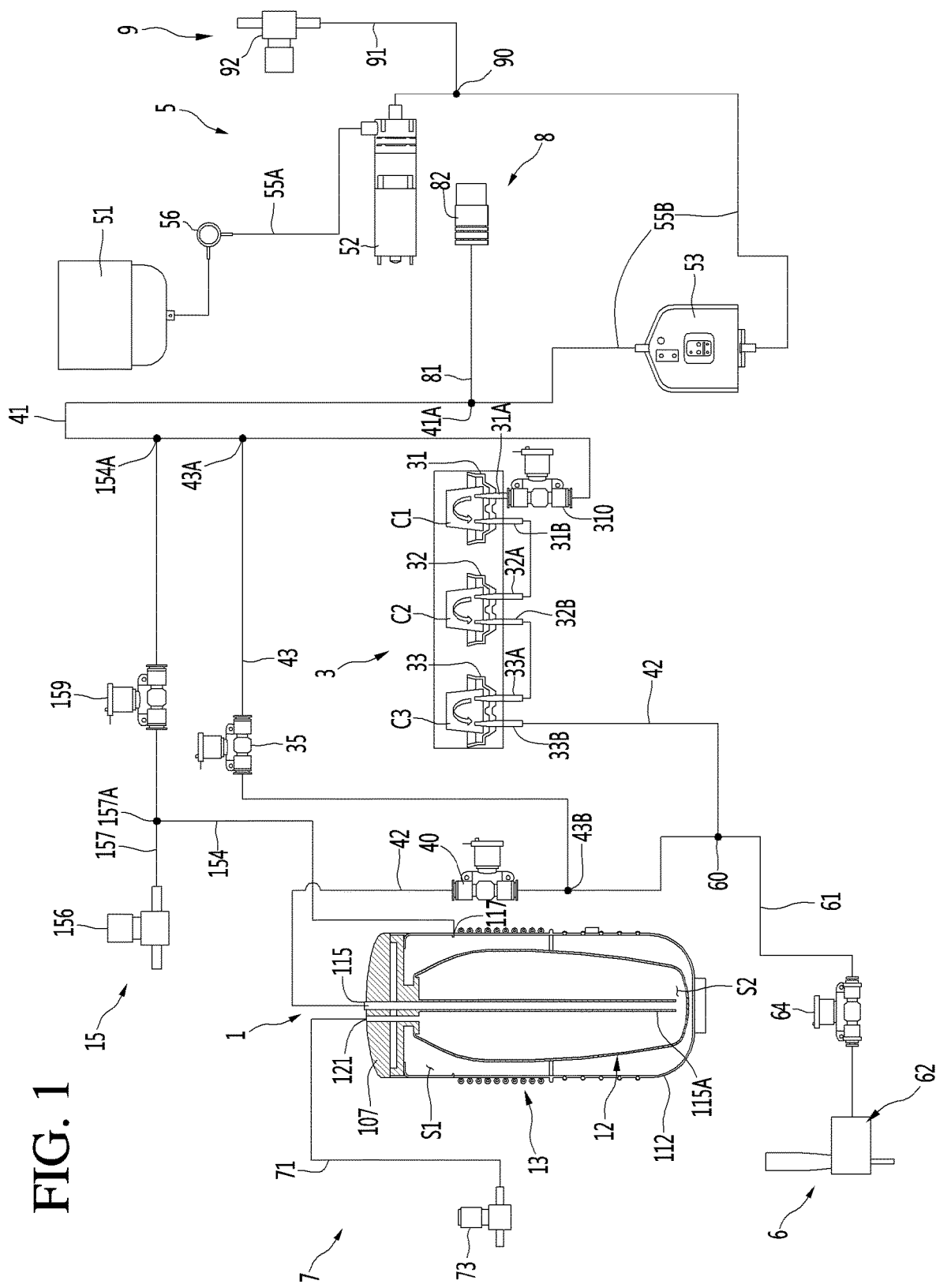
FIG. 1 is a configuration diagram of a beverage maker according to an embodiment.

FIG. 1 is a configuration diagram of a beverage making apparatus or beverage maker according to an embodiment. The beverage maker may include a fermentation module or device 1 in which a beverage may be fermented. The fermentation module 1 may also be referred to as a fermenter.

The beverage maker may include a water supply module or water supplier 5 to supply water, and may include a water supply pump 52. A material feeder or supplier 3 having capsule or material holders 31, 32, and 33 may hold materials or ingredients used to produce a beverage. The capsule holders 31, 32, and 33 may also be referred to as material accommodation portions.

The beverage maker may include a first main channel 41 connecting the water supplier 5 and the fermenter 1. A dispenser or beverage dispenser 6 may dispense a complete and/or final product made in the fermenter 1 to an outside. The beverage dispenser 6 may be connected to a second main channel 42 so that a beverage dispensed from the fermenter 1 is guided to the beverage dispenser 6 through at least a part of the second main channel 42.

The beverage maker may further include a gas discharger 7 connected to the fermenter 1 so as to discharge a gas generated during a brewing process. The beverage maker may further include an air injector or supplier 8 to inject air. The air injector 8 may be connected to the water supplier 5 or the first main channel 41 and may include an air pump 82.

The beverage maker may include an air conditioner or air controller 15 to regulate pressure between an inner wall of a fermentation tank 112 and an outer surface of a fermentation container 12 provided inside the fermentation tank 112. The air conditioner 15 may also be referred to as an air regulator, pressure controller, or a pressure regulator. An air removing module or air remover 9 may remove or discharge air inside the water supply pump 52.

Hereinafter, the fermenter 1 will be described in detail. The fermenter 1 may include the fermentation tank 112, which may have an opening and a fermentation lid 107 to open and close the opening. Details of the lid 107 may be found in U.S. application Ser. No. 16/189,028 filed on Nov. 13, 2018, the entire contents of which is incorporated by reference herein.

A first space or internal space S1 in which the fermentation container 12 is provided may be formed inside the fermentation tank 112. The first space S1 may be a space between the fermentation container 12 and the fermentation tank 112. The fermentation container 12 may thus be formed to be smaller than the internal space S1 of the fermentation tank 112.

The fermentation container 12 may be a container separately and/or detachably provided in the fermentation tank 112 so that beverage materials (or a completed beverage) do not get stuck on an inner wall of the fermentation tank 112. The fermentation container 12 may ferment a beverage in a second space or beverage making space S2, and may be taken out and cleaned or disposed of after using.

The fermentation container 12 may also be called a beverage pack, and may be a flexible package containing beverage making materials and ingredients. The fermentation container 12 may be formed of a flexible material that is easily inserted into the fermentation tank 112 and that may contract and expand according to pressure. However, the present invention is not limited thereto and the fermentation container 12 may alternatively have a more rigid material, depending on a configuration of the opening and/or lid 107 of the beverage tank 112.

The fermentation container 12, with ingredients contained therein, may be inserted into the fermentation tank 112 when the fermentation lid 107 is opened. The fermentation lid 107 may close and seal the fermentation tank 112 and also the fermentation container 12 after the fermentation container 12 is inserted, and may thus help ferment the material. The fermentation container 12 may be expanded by a pressure therein while the beverage is being made, and compressed by air inside the fermentation tank 112 when the completed beverage is dispensed and when air is supplied to the beverage making space S2.

The fermentation lid 107 may be provided above the fermentation tank 112 to cover the opening. The fermentation lid 107 may have a main channel connector or ingredient injection channel 115 connected to the second main channel 42. The main channel connector 115 may communicate with the beverage making space S2 of the fermentation container 12. The main channel connector 115 may also be referred to as a main channel connection portion.

Inside the fermentation container 12, a tube 115A communicating with the main channel connector 115 may be provided to extend in a longitudinal direction of the fermentation tank 112 (e.g., vertically). A lower end of the tube 115A may be adjacent to or provided within a bottom of the fermentation container 12, and the beverage in the fermentation container 12 may be easily intaken, suctioned, or received into the tube 115A when the beverage is dispensed.

The fermentation tank 112 may include a temperature controller 13 to adjust (i.e., heat or cool) an internal temperature of the fermentation tank 112 to maintain an optimal temperature for beverage fermentation. The temperature controller 13 may include at least one of a refrigerating cycle device and a heater. However, the present disclosure is not limited thereto, and the temperature controller 13 may include a thermoelectric element (TEM) or a heat-sink.

The refrigerating cycle device of the temperature controller 13 may control a temperature of the fermentation tank 112 by cooling or heating the fermentation tank 112, and may include a compressor 131 (FIG. 4), a condenser, an expansion device, and an evaporator. The evaporator may contact an outer surface of the fermentation tank 112. As an example, the evaporator may be configured as an evaporation tube wound on an outer surface of the fermentation tank 112.

Hereinafter, the main channels 41 and 42 and a bypass channel 43 will be described. The first main channel 41 may guide water supplied from the water supplier 5 to the material feeder 3, and the second main channel 42 may guide a mixture of a material extracted from the material feeder 3 and water to the fermenter 1.

A first end or portion 41A of the first main channel 41 may be connected to the water supplier 5, and a second end or portion may be connected to a material supply valve 310 and/or inlets 31A, 32A, and 33A of the material feeder 3. The material supply valve 310 may open and close the first main channel 41, and may be installed at the first main channel 41. The material supply valve 310 may be opened to open the first main channel 41 when materials or ingredients (e.g., additives) or capsules are contained in material or capsule holders 31, 32, and 33.

A first end or portion of the second main channel 42 may be connected to the main channel connector 115 of the fermenter 1 and a second end or portion may be connected to an outlet 31B, 32B, and/or 33B of the material feeder 3. A main valve 40 may open and close the second main channel 42 and may be installed at the second main channel 42. The main valve 40 may be opened to open the second main channel 42 when water, additive, or other ingredients are supplied to the fermentation container 12, or when air is injected into the fermentation container 12. In addition, the main valve 40 may be opened when a completed beverage is dispensed by the beverage dispenser 6. When a beverage is dispensed via the beverage dispenser 6, the completed beverage may flow to the beverage dispenser 6 through the main valve 40. The main valve 40 may be closed to close the second main channel 42 while the fermentation tank 112 is cooled, during fermentation, and when the beverage is aged or stored.

The main channels 41 and 42 may be configured as one continuous channel when the beverage maker does not include the material feeder 3. When the beverage maker includes the material feeder 3, the beverage maker may further include a bypass channel 43 connecting the first main channel 41 and the second main channel 42 in which water or air is configured to bypass the capsule holders 31, 32, and 33.

A first end 43A of the bypass channel 43 may be connected to the first main channel 41 between the water supplier 5 and the material supply valve 310, and a second end 43B may be connected to the second main channel 42 between the main valve 40 and the material feeder 3. A bypass valve 35 to open and close the bypass channel 43 may be installed at the bypass channel 43. The bypass valve 35 may be opened to open the bypass channel 43 when water supplied from the water supplier 5 is supplied to the fermentation container 12 and when air injected from the air injector 8 is supplied to the fermentation container 12.

Hereinafter, the material feeder 3 will be described in detail. As previously described, beer ingredients and materials may include water, malt, yeast, hop, flavor additives, etc.

Materials to produce a beverage may be dispersed and provided in the material feeder 3 and the fermentation container 12. Materials provided in the material feeder 3 may be supplied to the fermentation container 12 together with water supplied from the water supplier 5 and may be mixed with materials provided in the fermentation container 12.

The fermentation container 12 may, for example, hold main or base materials essential to make a certain beverage, and the material feeder 3 may hold secondary materials or additives to supplement the main materials. The additives provided in the material feeder 3 may be mixed with water supplied from the water supplier 5, and the water and materials mixture may be supplied to the fermentation container 12 and mixed with the main materials therein.

For example, in the case of beer, malt may be a main material provided in the fermentation container 12, and yeast, hops, flavor additives, etc. may be provided in the material feeder 3. When the beverage maker does not include the material feeder 3, the fermentation container 12 may accommodate the main materials and a user may directly inject an additive to the fermentation container 12.

When the beverage maker includes both the material feeder 3 and the fermentation container 12, a beverage may be made more easily. Hereinafter, for convenience of description, an example in which both the material feeder 3 and the fermentation container 12 are included in the beverage maker will be described. However, the present disclosure is not limited to the case of including both the material feeder 3 and the fermentation container 12, and the material feeder 3 may be optional.

The materials in the fermentation container 12 may be fermented over time, and the completed beverage made in the fermentation container 12 may flow into the second main channel 42 through the main channel connector 115 to the beverage dispenser 6 to be dispensed. The material feeder 3 may accommodate materials necessary to brew a beverage and may be configured to allow water supplied from the water supplier 5 to pass therethrough. For example, if the beverage made in the beverage maker is beer, the material provided in the material feeder 3 may be yeast, hops, flavor additives, etc.

The material provided in the material feeder 3 may be directly provided in the material or capsule holders 31, 32, and 33 formed in the material feeder 3. At least one capsule holder 31, 32, and/or 33 may be formed in the material feeder 3. When a plurality of capsule holders 31, 32, and 33 are included in the material feeder 3, the plurality of capsule holders 31, 32, and 33 may be formed to be demarcated and/or separated from each other, and different ingredients may be provided in different capsule holders 31, 32, and 33.

Inlets 31A, 32A and 33A into which a fluid flows in and outlets 31B, 32B and 33B through which a fluid or fluid mixture flows out may be formed in the capsule holders 31, 32 and 33, respectively. The fluid introduced into inlets 31A, 32A, or 33A of a capsule holder 31, 32, or 33 may be mixed with the material of the capsule holder 31, 32, or 33 and flow out to an outlet 31B, 32B, or 33C.

Alternatively, the materials provided in the material feeder 3 may be provided in material containers or capsules C1, C2, and C3. The capsules C1, C2, and C3 may be provided in the capsule holders 31, 32, and 33, and the capsule holders 31, 32, and 33 may be termed as capsule mounting portions. In this case, the capsules C1, C2, and C3 may be configured to fit into the capsule holders 31, 32, and 33. The capsules C1, C2, and C3 may be formed of a capsule, package, or pod, but are not limited thereto.

When the material is provided in the capsules C1, C2, and C3, the material feeder 3 may be configured to enable the capsules C1, C2, and C3 to be seated and drawn out. The material feeder 3 may include a capsule kit assembly in which the capsules C1, C2, and C3 are separately provided.

As an example, the material feeder 3 may accommodate a first additive, a second additive, and a third additive. The first additive may be yeast, the second additive may be hop, and the third additive may be a flavoring additive. The material feeder 3 may include a first capsule holder 31 in which a first capsule C1 containing the first additive is provided, a second capsule holder 32 in which a second capsule C2 containing the second additive is provided, and a third capsule holder 33 in which a third capsule C3 containing the third additive is provided.

The materials housed either directly in the capsule holders 32, 33, or 34 or alternatively in the capsules C1, C2, and C3 may be extracted by a water pressure of water supplied from the water supplier 5. When the material is extracted by water pressure, water supplied from the water supplier 5 to the first main channel 41 may be mixed with a material while passing through the capsule holders 32, 33, or 34 or the capsules C1, C2, and C3 to extract the materials, and the materials may flow into the second main channel 42 together with water.

The material feeder 3 may accommodate a plurality of different kinds of additives or materials separated from each other. When a plurality of capsule holders 31, 32, and 33 are formed in the material feeder 3, the plurality of capsule holders 31, 32, and 33 may be connected in series or in parallel with respect to a flow direction of water.

For example, as illustrated in FIG. 1, when a plurality of capsule holders 31, 32, and 33 are connected in series, a first main channel 41 may be connected to the inlet 31A of a first capsule holder 31 (i.e., a first inlet 31A), the outlet 31B of the first capsule holder 31 (i.e., a first outlet 31B) may communicate with the inlet 32A of the second capsule holder 32 (i.e., a second inlet 32A), the outlet 32B of the second capsule holder 32 (i.e., a second outlet 32B) may communicate with the inlet 33A of the third capsule holder 33 (i.e., a third inlet 33A), and the outlet 33B of the third capsule holder 33 (i.e., a third outlet 33B) may be connected to the second main channel 42.

Hereinafter, the water supplier 5 will be described in detail. The water supplier 5 may include a water tank or chamber 51, the water supply pump or water pump 52 to pump water in the water tank 51, and a water supply heater or water heater 53 heating the water pumped from the water supply pump 52.

The water supply pump 52 may include a gear pump. The gear pump may be a kind of rotary pump that feeds a liquid via two rotors engaged with each other. Since an internal structure of the gear pump is a known art, a detailed description thereof will be omitted.

The water tank 51 and the water supply pump 52 may be connected to a water tank water ejection channel or a water ejection channel 55A, and water housed in the water tank 51 may be intaken or received into the water supply pump 52 through the water ejection channel 55A. The water supply pump 52 and the first end 41A of the first main channel 41 may be connected to a water supply channel 55B, and water discharged from the water supply pump 52 may be guided to the first main channel 41 through the water supply channel 55B.

A flow meter 56 that measures a flow rate of water ejected from the water tank 51 may be installed at the water ejection channel 55A. The water tank 51 may include a water level sensor (not shown) that measures an amount of water stored in the water tank 51.

The water supply heater 53 may be installed at the water supply channel 55B. When the water supply pump 52 is driven, water in the water tank 51 may be taken or received into the water supply pump 52 through the water ejection channel 55A, and water discharged from the water supply pump 52 may be heated by the water supply heater 53 while flowing through the water supply channel 55B so as to be guided to the first main channel 41.

Hereinafter, the beverage dispenser 6 will be described. The beverage dispenser 6 may be connected to the second main channel 42. The beverage dispenser 6 may include a beverage dispensing channel 61 communicating with the fermenter 1, a beverage dispensing valve or liquid discharge valve 64 installed at the beverage dispensing channel 61, and a dispenser 62 connected to the beverage dispensing channel 61.

The beverage dispensing channel 61 may be connected to the second main channel 42 and communicate with the beverage making space S2 of the fermentation container 12. A first end 60 of the beverage dispensing channel 61 may be connected to the second main channel 42 between the material feeder 3 and the main valve 40, and a second end may be connected to the dispenser 62.

The beverage dispensing valve 64 may open and close the beverage dispensing channel 61. The beverage dispensing valve 64 may include a solenoid valve. When the beverage is dispensed, the beverage dispensing valve 64 may be opened, and when the beverage is not dispensed, the beverage dispensing valve 64 may be kept closed.

The beverage may be guided to the dispenser 62 after passing through the beverage dispensing valve 64. The user may control dispensing of the beverage by operating the dispenser 62. When the user opens the dispenser 62, the beverage may be dispensed from the dispenser 62.

Hereinafter, the gas discharger 7 will be described in detail. The gas discharger 7 may be connected to the fermenter 1 and may discharge a gas generated inside the fermentation container 12. The gas discharger 7 may include a gas discharge channel 71 connected to the fermenter 1 and a gas discharge valve 73 connected to the gas discharge channel 71.

The gas discharge channel 71 may be connected to the fermentation lid 107. The fermentation lid 107 may be provided with a gas discharge channel connection portion or a gas discharge channel connector 121 to which a gas discharge channel 71 is connected.

The gas discharge channel connector 121 may communicate with the beverage making space S2 of the fermentation container 12. The gas in the fermentation container 12 may flow to the gas discharge channel 71 through the gas discharge channel connector 121 and may be discharged to the opened gas discharge valve 73. The gas discharge channel connector 121 may be a channel or path formed through the fermentation lid 107 and an upper portion of the fermentation container 12.

In the beverage maker, air may be injected into the fermentation container 12 via the air injector 8 to mix the malt and water evenly, and bubbles generated from the liquid malt (i.e., in the beverage making space S2) may be discharged to the outside through the gas discharge channel 71 and the gas discharge valve 73 at an upper portion of the fermentation container 12. Further, the gas discharge valve 73 may be kept closed during the fermentation stage of the brewing process.

Hereinafter, the air injector 8 will be described. The air injector 8 may be connected to the water supply channel 55B or the first main channel 41 to inject air. Air injected into the first main channel 41 from the air injector 8 may be injected into the fermentation container 12 (i.e., in beverage making space S2) sequentially through the bypass channel 43 or the second main channel 42. Accordingly, stirring or aeration may be performed in the fermentation container 12.

The air injected into the first main channel 41 from the air injector 8 may remove residual water or remnants while passing through the capsule holders 31, 32 and 33. Thus, the capsule holders 31, 32, and 33 may be kept clean.

The air injector 8 may include an air injection channel 81 connected to the water supply channel 55B or the first main channel 41 and an air pump 82 connected to the air injection channel 81. The air pump 82 may pump air into the air injection channel 81.

Hereinafter, the air conditioner 15 will be described in detail. The air conditioner 15 may regulate pressure between an inner wall of the fermentation tank 112 and an outer surface of the fermentation container 12; i.e., in the inner space S1.

The air conditioner 15 may supply or exhaust air to or from the inner space S1. The air conditioner 15 may include an air supply channel 154 connected to the fermenter 1 and an exhaust channel 157 connected to the air supply channel 154 to exhaust air to the outside.

A first end 154A of the air supply channel 154 may be connected to the first main channel 41, and a second end may be connected to the fermenter 1. The fermentation tank 112 may include an air supply channel connection portion or air supply channel connector 117 to which the air supply channel 154 is connected, and the air supply channel connector 117 may communicate with the inner space S1. Alternatively, the air supply channel connector 117 may be provided on the fermentation lid 107 rather than on the fermentation tank 112.

Air injected from the air injector 8 into the first main channel 41 may be guided through the air supply channel 154 between the outer surface of the fermentation container 12 and the inner wall of the fermentation tank 112. As described above, the air supplied into the fermentation tank 112 may pressurize the fermentation container 12 between the outer surface of the fermentation container 12 and the inner wall of the fermentation tank 112.

The beverage in the fermentation container 12 may be pressurized by air, and when the main valve 40 and the beverage dispensing valve 64 are opened, the beverage may flow to the second main channel 42 through the main channel connector 115. The beverage flowing from the fermentation container 12 to the second main channel 42 may be dispensed to the outside through the beverage dispenser 6.

The exhaust channel 157 may serve as an air exhaust passage to exhaust air between the fermentation container 12 and the fermentation tank 112 (i.e., from inner space S1) to the outside together with a part of the air supply channel 154. The air supply channel 154 may include a first channel or portion from a the first end 154A connected to the first main channel 41 to a connection portion or joint 157A connected to the exhaust channel 157, and a second channel or portion from the first end 154A to the air supply channel connector 117.

The first channel of the air supply channel 154 may be an air supply channel to guide air pumped by the air pump 82 to the second channel. The second channel may be an air supply and exhaust channel to supply air passing through the air supply channel to the inner space S1 or guiding air flowing out of the inner space S1 to the exhaust channel 157.

An exhaust valve 156 to open and close the exhaust channel 157 may be connected to the exhaust channel 157. The exhaust valve 156 may be opened so that air in the inner space S1 may be exhausted when the fermentation container 12 is inflated during beverage making.

The air conditioner 15 may further include an air supply valve 159 controlling air pumped by the air pump 82 and supplied to the inner space S2. The air supply valve 159 may be installed between the first end 154A of the air supply channel 154 and the first end 157A of the exhaust channel 157.

Hereinafter, the air removing module 9 will be described in detail. As described above, the water supply pump 52 may include a gear pump. As the gear pump is used, lubricating oil (grease) applied to a surface of an internal rotor surface and the pump may be gradually consumed. As a result, when the gear pump is used more than a preset number of times, a pressure difference between an inlet side and an outlet side of the water supply pump 52 made due to the gear pump may be gradually reduced. The inlet side of the water supply pump 52 may be connected to the water ejection channel 55A and the outlet side may be connected to the water supply channel 55B.

Due to the large number of components connected to the water supply channel 55B and the main channels 41 and 42, a high flow resistance may act on the water supply pump 52, and when a power or strength of the water supply pump weakens due to long or frequent use, the water supply pump 52 may not send a sufficient amount of water to the water supply channel 55B. To solve this problem, the beverage maker may include an air removing module 9.

The air removing module 9 may remove a flow resistance acting on the water supply pump 52. The air in the water supply pump 52 may be removed by the air removing module 9, and the water in the water storage tank 51 may instead be introduced into the water supply pump 52 via hydraulic pressure. Accordingly, the water supply pump 52 may smoothly supply water through the water supply channel 55B.

The air removing module 9 may include an air removing channel 91 and an air removing valve 92 connected to the air removing channel. The air removing channel 91 may be connected to the water supply channel 55B. As an example, the air removing channel 91 may be connected to a point of the water supply channel 55B adjacent to the water supply pump 52, such as between the water supply pump 52 and the water supply heater 53 in the water supply channel 55B. A connection portion or joint 90 of the air removing channel 91 and the water supply channel 55B may be closer to the water supply pump 52 than to the water supply heater 53.

The air removing valve 92 may include a solenoid valve. The air removing channel 91 may be opened when the air removing valve 92 is open, and the air in the air removing channel 91 may be discharged to the outside through the air removing valve 92. Accordingly, the air in the water supply pump 52 may flow into the air removing channel 91, and the water in the water tank 51 may be introduced into the water supply pump 52 by hydraulic pressure. When the water supply pump 52 operates, the air removing valve 92 may be kept closed to prevent water from flowing into the water supply channel 55B, and when the water supply pump 52 is stopped, the air removing valve 92 may be opened.

When the water tank 51 is refilled with water, the air removing valve 92 may be opened for a preset period of time, and the water supply pump 52 may operate after the air removing valve 92 is closed. This process will be described in detail later.

Figure 2:
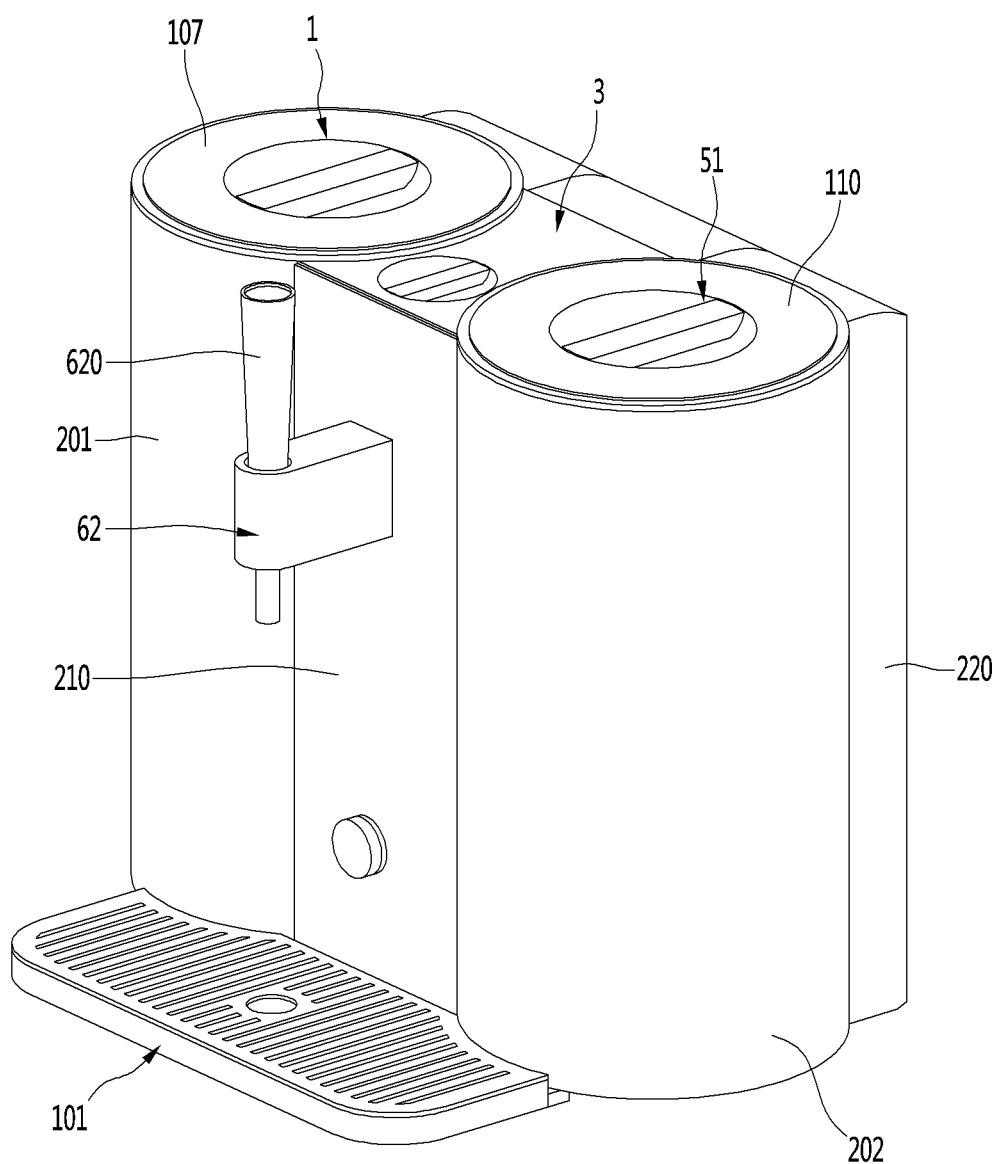
FIG. 2 is a perspective view of a beverage maker according to an embodiment.
Figure 3:
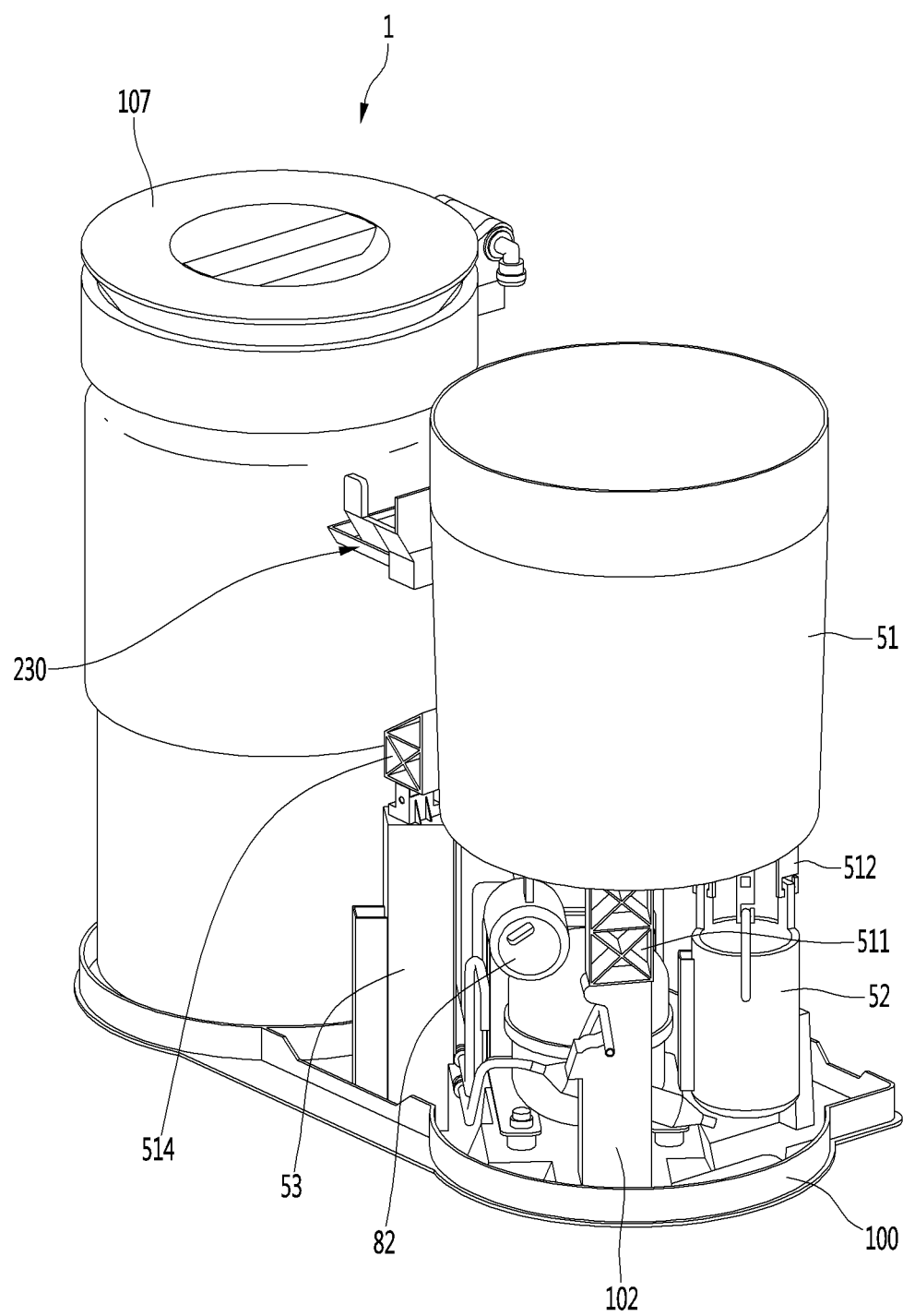
FIG. 3 is a perspective view of the beverage maker without each cover and a material feeder in FIG. 2.
Figure 4:
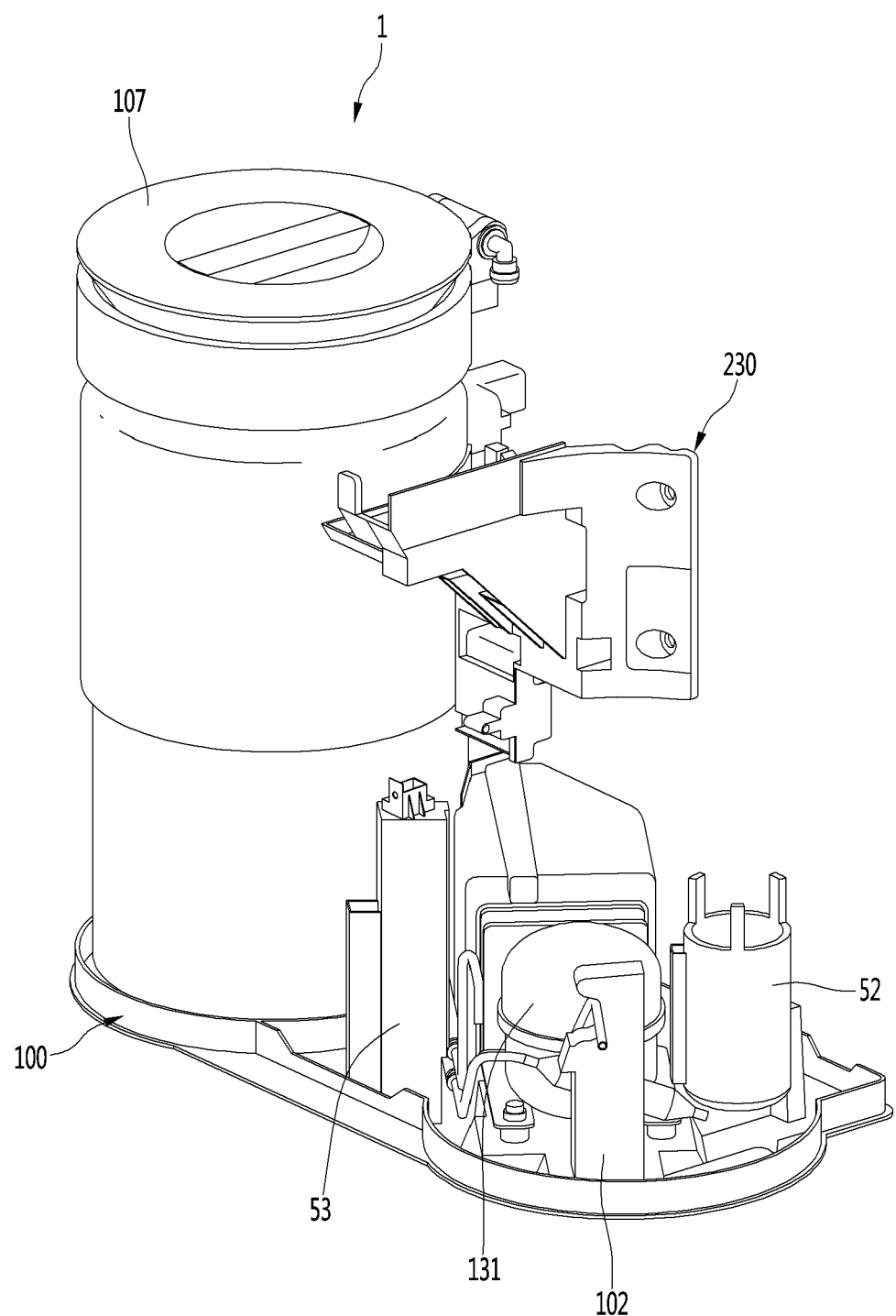
FIG. 4 is a perspective view of the beverage maker without a water tank in FIG. 3.

Referring to FIGS. 2-4, the beverage maker may include a base 100. The base 100 may form an appearance of a bottom surface of the beverage maker. The beverage maker may further include a beverage container or drip tray 101 to receive and store a beverage or any liquid dispensed from the dispenser 62. The drip tray 101 may be integrally formed with the base 100 or may be coupled to the base 100. The drip tray 101 may be positioned in front of the base 100.

A beverage dispensed from the dispenser 62 and dropped down around a drinking vessel (not shown) may fall to the drip tray 101 and may be temporarily kept inside the drip tray 101 through a hole of the drip tray 101 before being discarded later. Thus, a periphery of the beverage maker may be kept clean.

The fermenter 1 may be provided on an upper side of the base 100 and may be supported by the base 100 from a lower side. The water tank 51 may be provided above the base 100. A bottom surface of the water tank 51 may be spaced apart from an upper surface of the base 100 in an up-down (i.e., vertical) direction.

The base 100 may include a water tank support portion or water tank support 102 to support the water tank 51. The water tank 51 may have a first connection portion or frame 511 connected to and supported by the water tank support 102. The water tank support 102 may protrude upward from the base 100, and the first connection frame 511 may protrude downward from the water tank 51. Since the water tank support 102 and the first connection frame 511 may extend vertically, a bottom surface of the water tank 51 may be spaced apart from the base 100 vertically.

The water supply heater 53 may be installed at the base 100, and a second connection portion or frame 514 connected to and supported by the water supply heater 53 may be formed in or adjacent to the water tank 51. Since the water supply heater 53 may extend vertically, the bottom surface of the water tank 51 may be vertically spaced apart from the base 100. A first side of the water tank 51 may be supported by the water tank support 102 formed at the base 100, and a second side may be supported by the water supply heater 53.

The water supply pump 52 and the air pump 82 may be provided between the water tank 51 and the base 100, or below the water tank 51. The water tank 51 may have a water supply pump support portion or water supply pump support 512 to which the water supply pump 52 may be coupled to and suspended by.

The water supply pump support 512 may extend downward from the bottom surface of the water tank 51. The water supply pump 52 may include a water supply pump case connected to the water supply pump support 512 and a water supply pump body provided in the water supply pump case and having an inlet connected to the water ejection channel 55A and an outlet connected to the water supply channel 55B.

The water tank 51 may be spaced apart from the fermenter 1 in a horizontal (i.e., left-right) direction. The beverage maker may further include a water tank lid 110 covering an open upper surface of the water tank 51. The water tank lid 110 may open and close the open upper surface of the water tank 51.

The water tank lid 110 may be formed in a shape which is the same as or similar to that of the fermentation lid 107. As a result, the beverage maker may have a unified sense of design, and the same components or materials may be utilized as the water tank 110 and the fermentation lid 107, respectively.

Meanwhile, the beverage maker may include covers or frames 201, 202, 210, and 220 that form an appearance of the beverage maker. The covers 201, 202, 210, and 220 may be integrally formed, or, alternatively, separately formed and coupled to each other depending on manufacturing and maintenance needs.

The covers 201, 202, 210 and 220 may include a fermenter cover or frame 201, a water tank cover or frame 202, a front cover or frame 210, and a rear cover or frame 220.

The fermenter cover 201 and the water tank cover 202 may surround at least portions of outer circumferences of the fermenter 1 and the water tank 51, respectively. The fermenter cover 201 and the water tank cover 51 may fix or stabilize the fermenter 1 and the water tank 51 and protect them from an external impact.

The fermenter cover 201 and the water tank cover 202 may be provided to be spaced apart from each other in a horizontal direction. An upper surface of the fermenter cover 201 may be open to expose an upper surface of the fermentation lid 1097. Further, an upper surface of the water tank cover 202 may be open to expose an upper surface of the water tank lid 110. Accordingly, the user may easily open and close the fermentation lid 107 and the water tank lid 110.

The front cover 210 may configure a front side appearance of the beverage maker. The front cover 210 may be provided between the fermenter cover 201 and the water tank cover 202 to cover a space between the fermenter cover 201 and the water tank cover 202 from the front side of the beverage maker. First and second (i.e., left and right) ends or sides of the front cover 210 may be in contact with the fermenter cover 201 and the water tank cover 202, respectively.

The rear cover 220 may form an appearance of a rear side of the beverage maker. The rear cover 220 may cover a space between the fermenter cover 201 and the water tank cover 202 from the rear of the beverage maker.

The material feeder 3 may be provided between the fermenter 1 and the water tank 51. Thus, the beverage maker may be manufactured to be more compact, and the material feeder 3 may be protected by the fermenter 1 and the water tank 51.

The material feeder 3 may be positioned between the front cover 210 and the rear cover 220 in a front-rear direction. A front surface of the material feeder 3 may be covered by the front cover 210 and a rear surface may be covered by the rear cover 220.

The dispenser 62 may be mounted on the front cover 210, at, e.g., a front surface of the front cover 210. The dispenser 62 may be positioned above the drip tray 101. The user may dispense a beverage by operating a lever 620 (e.g., rotation lever) of the dispenser 62.

The beverage maker may further include a main frame 230. At least one of the material supply valve 310, the main valve 40, the bypass valve 35, the air supply valve 159, the exhaust valve 156, the beverage dispensing valve 64, the gas discharge valve 73, and the air removing valve 92 may be mounted on the main frame 230. For example, the main frame 230 may have an air removing valve mounting portion 239 (see FIG. 5) on which the air removing valve 92 is mounted.

The main frame 230 may be coupled to rear sides of the fermenter 1 and the water tank 51 and vertically spaced apart from the base 100. At least a portion of the main frame 230 may be positioned between the fermenter 1 and the water tank 51, and at least a portion of the main frame 230 may be positioned below the material feeder 3.

Figure 5:
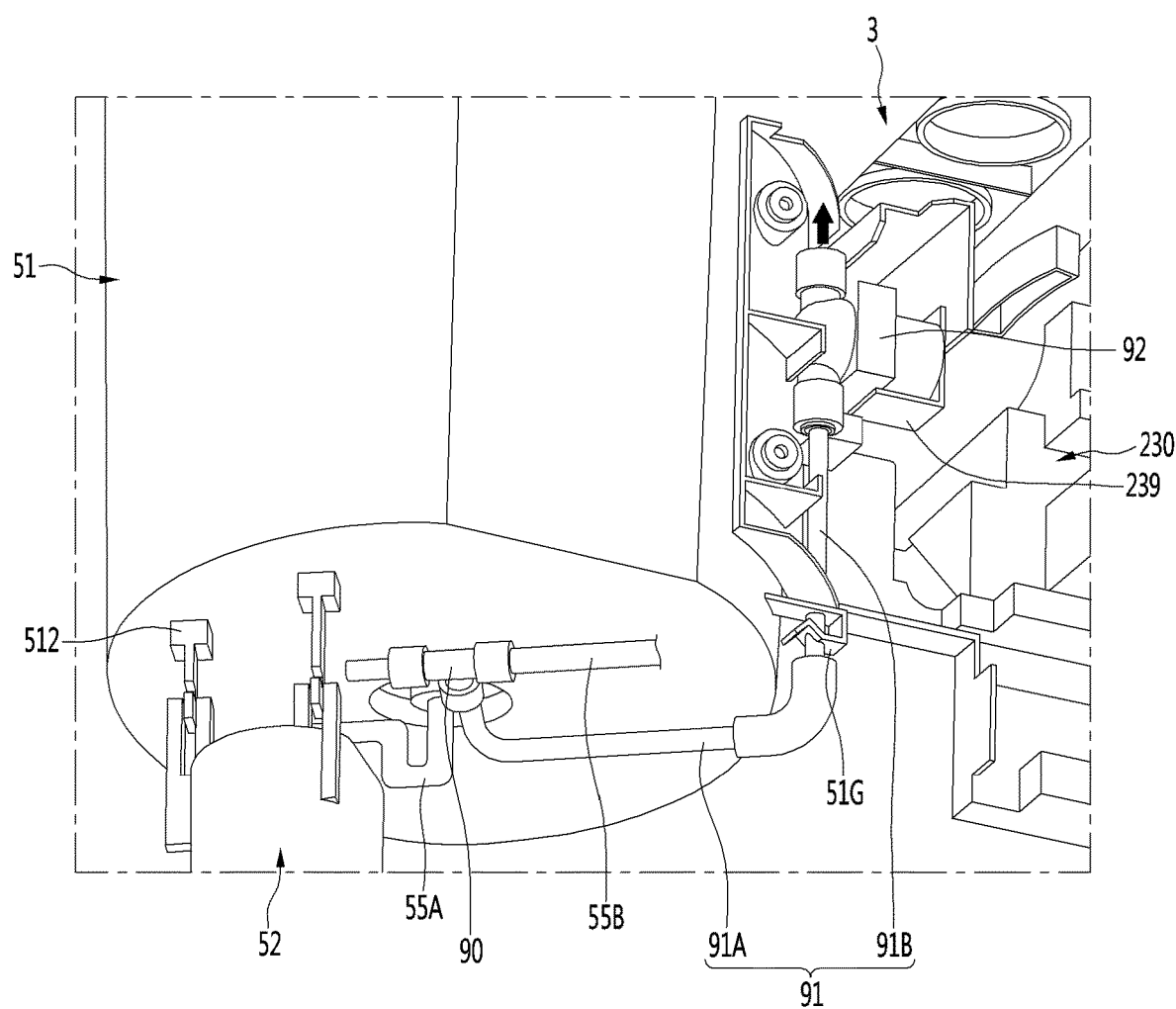
FIG. 5 is a diagram illustrating an air removing module according to an embodiment.

Referring to FIG. 5, the water ejection channel 55A may be connected to a bottom surface or lower side of the water tank 51 and also connected to the water supply pump 52. Since the water supply pump 52 may be positioned below the water tank 51, when the air removing valve 92 is opened, water from the water tank 51 may flow into the water supply pump 52 through the water ejection channel 55A by hydraulic pressure of water stored in the water tank 51 even though the water supply pump 52 may not operate.

The water supply channel 55B may be connected to the water supply pump 52 from a lower portion of the water tank 51. The connection portion 90 of the water supply channel 55B and the air removing channel 91 may be positioned on a lower portion of the water tank 51. The air removing channel 91 may include a connection channel 91A connected to the water supply channel 55B and a vertical channel 91B extending vertically from the connection channel 91A and connected to the air removing valve 92.

The connection channel 91A may be arranged substantially horizontally. At least a portion of the connection channel 91A may be positioned below the water tank 51. The connection channel 91A may guide air in the water supply channel 55B to the vertical channel 91B.

The vertical channel 91B may extend upward (i.e., in a vertical direction) from the connection channel 91A. At least a portion of the vertical channel 91B may be positioned behind the water tank 51. The vertical channel 91B may guide air guided from the connection channel 91A to the air removing valve 92.

The water tank 51 may have a channel fixing portion or bracket 51G to fix the vertical channel 91B. The channel fixing portion 51G may include a protrusion protruding outward from an outer circumference of the water tank 51 and a through hole formed at the protrusion and allowing the vertical channels 91B to pass therethrough. Accordingly, the vertical channel 91B may be fixed in position and prevented from being shaken or vibrated.

The main frame 230 may have an air removing valve mounting portion 239 on which the air removing valve 92 is mounted. The air removing valve mounting portion 239 may be formed on a rear surface of the main frame 230. The air removing valve 92 may be mounted on the air removing valve mounting portion 239 such that air is discharged upward.

The air removing valve 92 may be positioned between the fermenter 1 (see FIGS. 2 to 4) and the water tank 51 in a left-right direction, and may be positioned closer to the water tank 51 than the fermenter 1. Further, the air removing valve 92 may be positioned between the base 100 (see FIGS. 2 to 4) and the material feeder 3 in an up-down direction, and between the main frame 230 and the rear cover 220 (see FIG. 2) in a front-rear direction. Accordingly, the air removing valve 92 may be safely protected inside the beverage maker.

Figure 6:
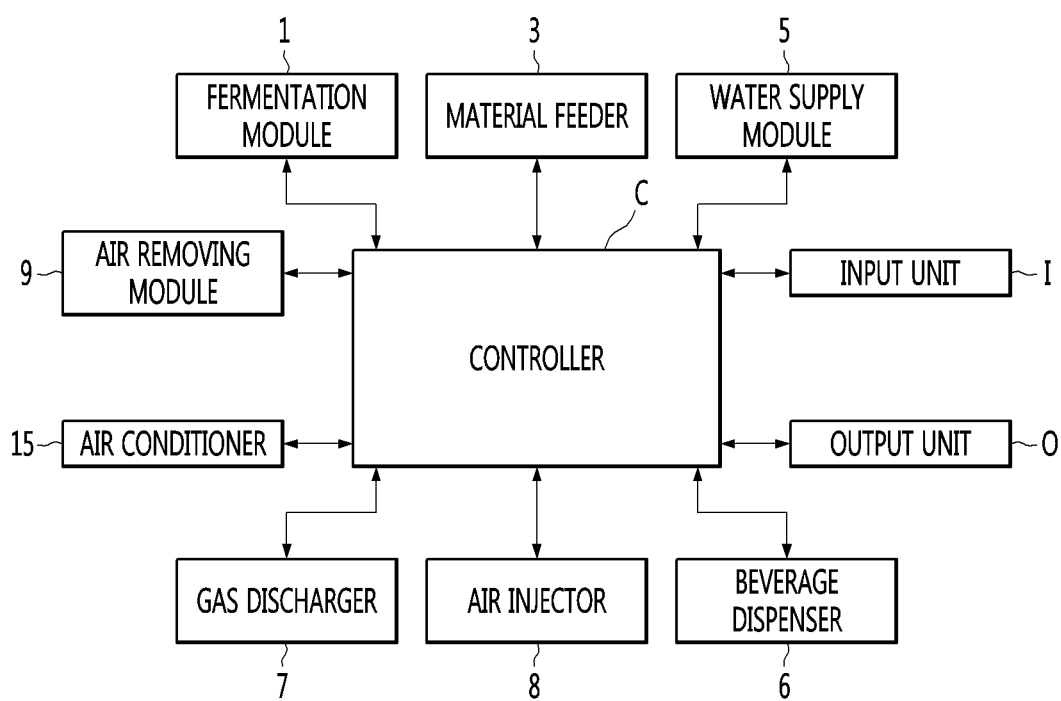
FIG. 6 is a control block diagram of a beverage maker according to an embodiment.
Figure 7:
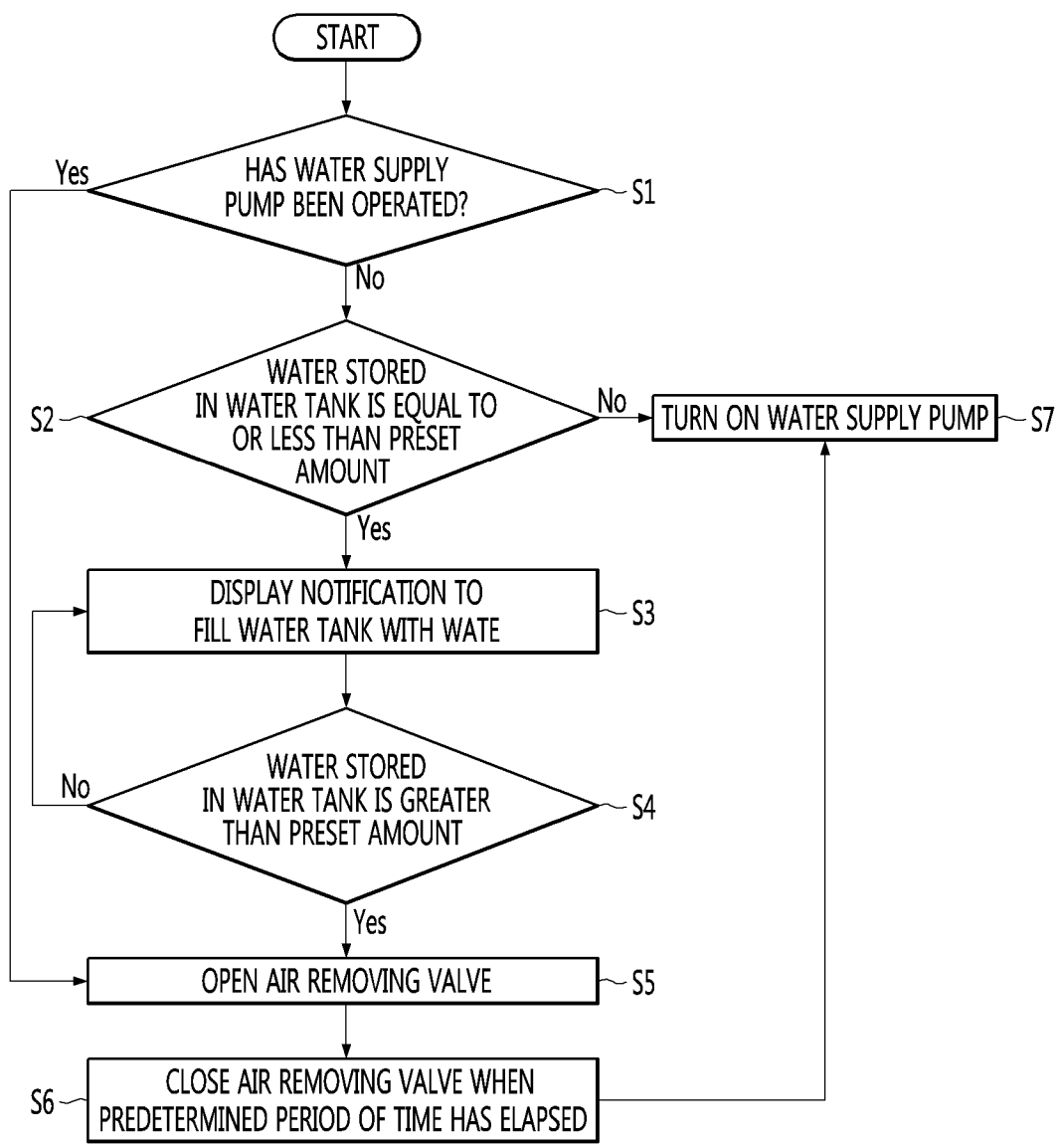
FIG. 7 is a flowchart showing a control procedure in case of operating a water supply pump.
Figure 8:
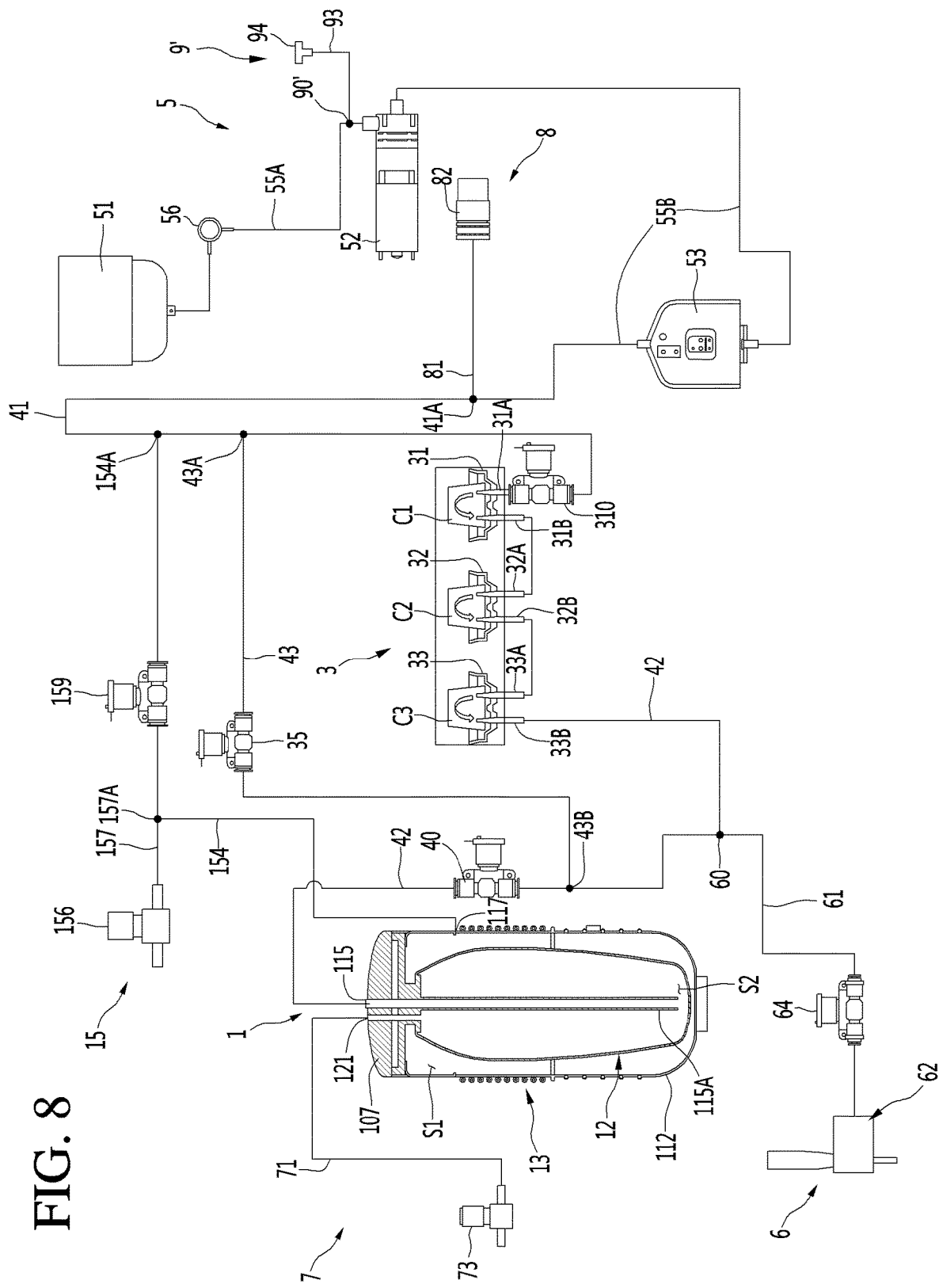
FIG. 8 is a configuration diagram of a beverage maker according to an embodiment.
Figure 9:
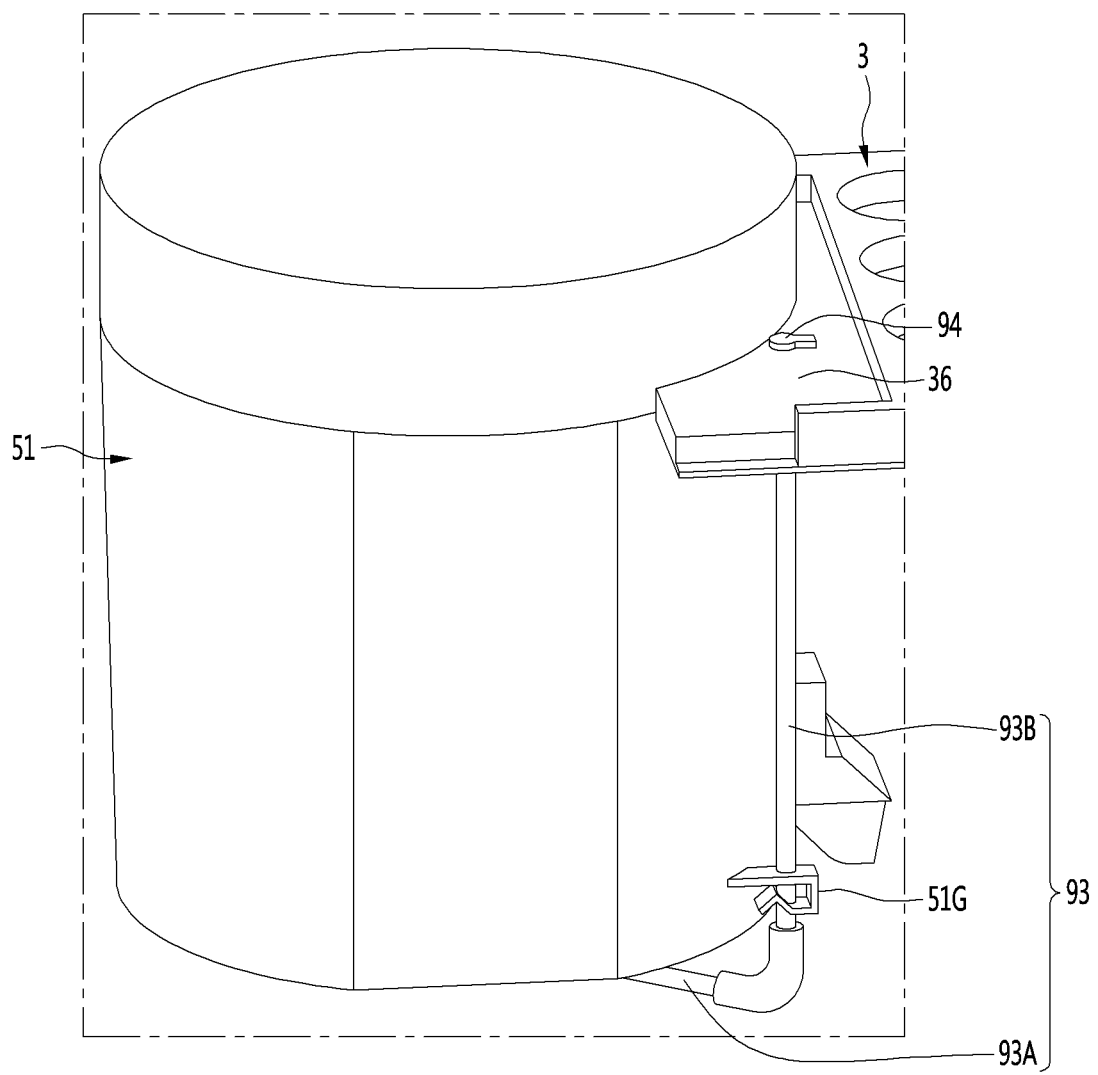
FIG. 9 is a view illustrating an air removing module according to an embodiment.
Figure 10:
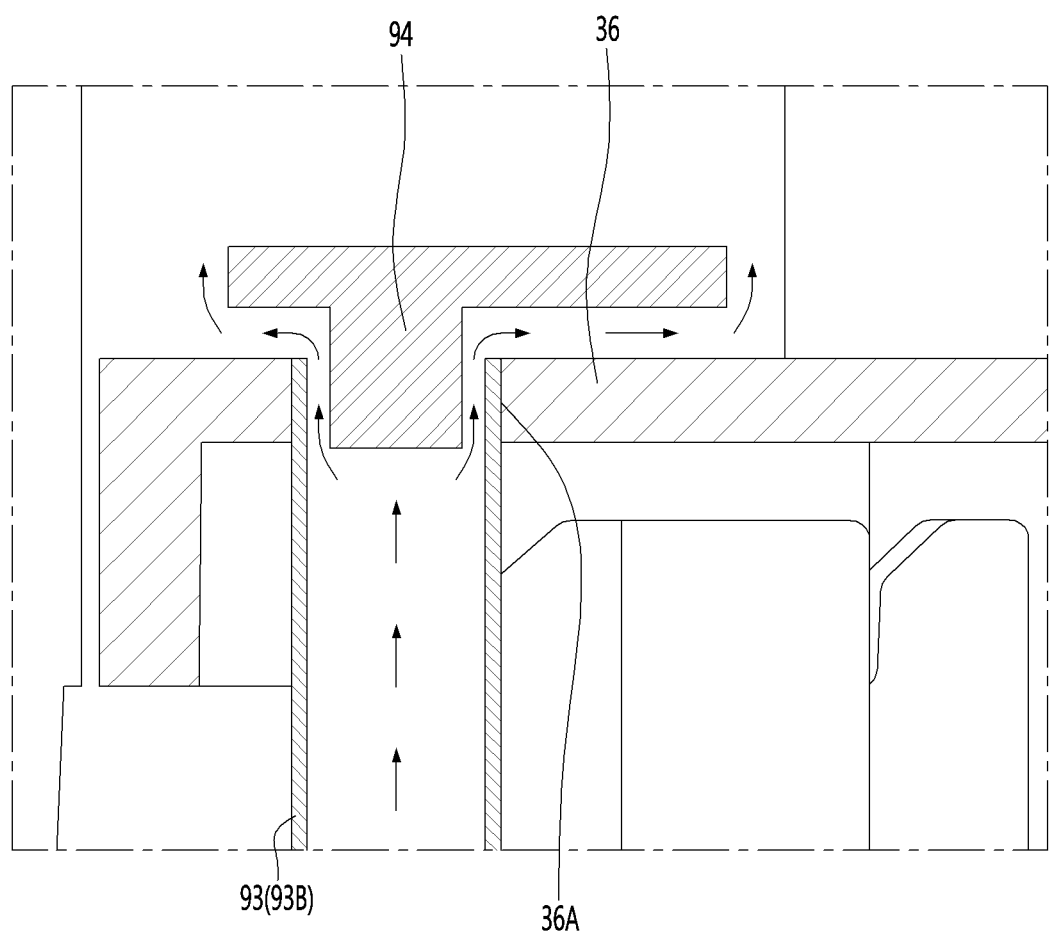
FIG. 10 is a view showing a flow of air which opens a cap along an air removing channel.
Figure 11:
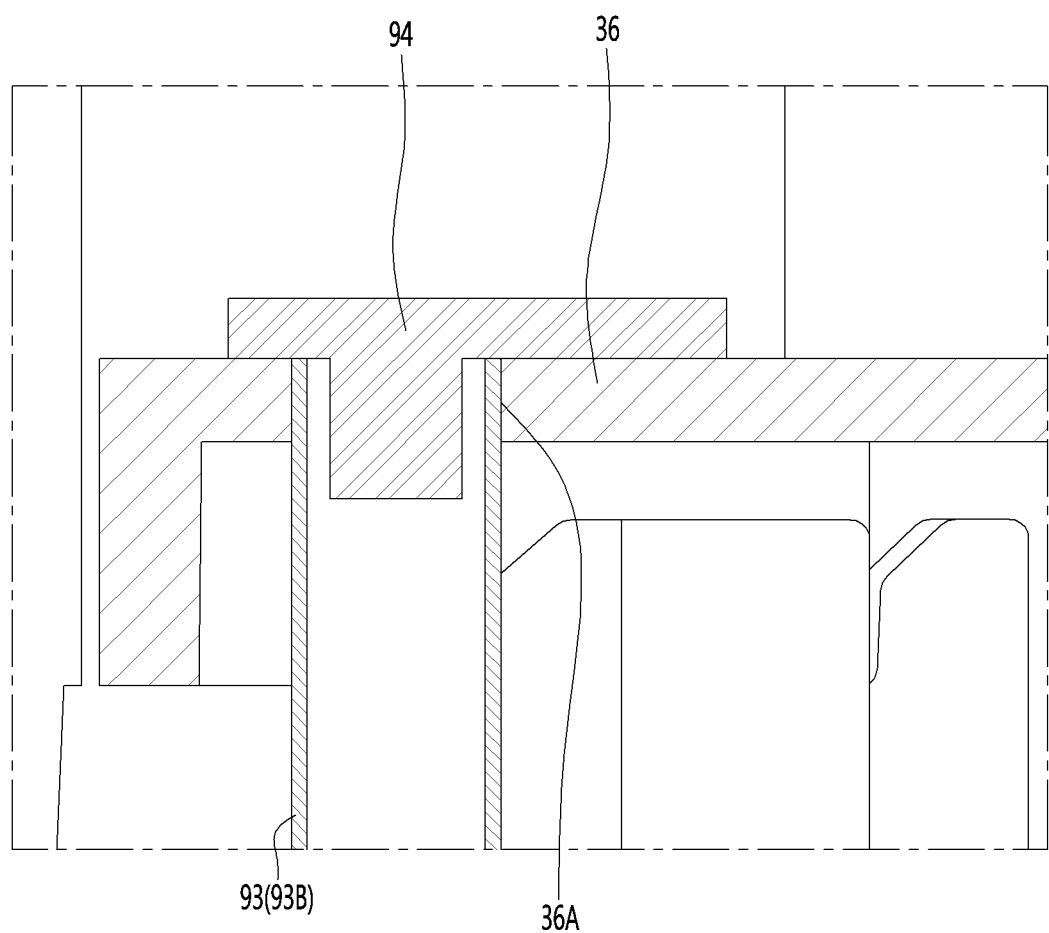
FIG. 11 is a view showing a state in which a cap is adsorbed to an air removing channel.

Referring to FIGS. 6-7, the beverage maker may further include a controller C, an input unit or module I, and an output unit or module O. The input unit I may be configured to receive a user command, and a type of the input unit I is not limited. For example, the input unit I may include at least one of a button, a switch, a knob, a microphone, and a touch display. The output unit O may be configured to transmit a notification to a user, and a type thereof is not limited. In an example, the output O may include at least one of a display and a speaker.

The controller C may receive an inputted user command from the input unit I and may transmit a notification to the output unit O. Further, the controller C may control an overall operation of the beverage maker. The controller C may control at least one of the fermenter 1, the material feeder 3, the water supplier 5, the beverage dispenser 6, the gas discharger 7, the air injector 8, the air removing module 9, and the air conditioner 15. Further, the controller C may receive a sensing value from a sensor included in at least one of the fermenter 1, the material feeder 3, the water supplier 5, the beverage dispenser 6, the gas discharger 7, the air injector 8, the air removing module 9, and the air conditioner 15.

The controller C may control the beverage maker according to a beverage making step during a brewing process. The beverage process may start in a state in which water is stored in the water tank 51, the fermentation container 12 is provided in the fermenter 1, and the capsules C1, C2, and C3 are provided in the material feeder.

The beverage making steps may include at least one of a water supply step of supplying water to the fermenter 1 from the water supplier 5, an air supply step of supplying air to the fermenter 1 from the air injector 8, a temperature controlling step of controlling a temperature of the fermenter 1 by the temperature controller 13, a material injecting step of extracting a material or ingredient provided in the material feeder 3 by water ejected from the water supplier 5 and injecting the extracted material to the fermenter 1, a fermenting step of fermenting a beverage in the fermenter 1, an aging step of aging the beverage in the fermenter 1, and a cleaning step of sterilizing and/or cleaning an internal channel and components of the beverage maker by water ejected from the water supplier 5.

The controller C may turn on the water supply pump 52 at least once during the brewing process. The controller C may turn on the water supply pump 52 during the water supply step, the material injecting step, and/or the cleaning step. When the water supply pump 52 is to be turned on, the controller C determines whether the operation of the air removing module 9 is necessary, and if necessary, the controller C may operate the air removing module 9, and thereafter, turn on the water supply pump 52.

Hereinafter, a control method of the air removing module 9 will be described in more detail with reference to FIG. 7. When the water supply pump 52 is to be turned on, the controller C may determine whether the water supply pump 52 has previously been operated (S1) since a current brewing process was started or whether the operation of the water supply pump 52 is a first operation of the water supply pump 52 after starting the brewing process.

When the water supply pump 52 is operated for the first time after the brewing process started, the water supply pump 52 may be filled with air and the controller C may open the air removing valve 92 (S1) (S5). When the air removing valve 92 is opened, the air in the water supply pump 52 and the water supply channel 55B may be discharged through the air removing channel 91 and the air removing valve 92, and water from the water tank 51 may flow into the water supply pump 52 through the water ejection channel 55A by hydraulic pressure.

The controller C may close the air removing valve 92 when a preset or predetermined period of time has elapsed since the air removing valve 92 was opened (S6). The controller C may open the air removing valve 92 for the preset time, which may be, e.g., 2 seconds.

After the air removing valve 92 is closed, the controller C may turn on the water supply pump 52 (S7). Since the water supply pump 52 is filled with water, the amount of water discharged from the water supply pump 52 may be greater than when air is present in the water supply pump 52 and/or the water supply pump 52 is filled with air. In addition, since the air removing valve 92 is closed, water pumped by the water supply pump 52 to the water supply channel 55B may be prevented from flowing to the air removing channel 91.

If the water supply pump 52 is not operated for the first time since the beverage making step was started (i.e., when the water supply pump 52 has in fact been previously operated), the controller C may determine whether the water stored in the water tank 51 is equal to or less than a preset amount (S2). For example, the water tank 51 may have a water level sensor, and the controller C may calculate the amount of water remaining in the water tank 51 from the water level sensor. Alternatively, the controller C may calculate the amount of water ejected from the water tank 51 by the flow sensor 56 (see FIG. 1) to further calculate the amount of water remaining in the water tank 51.

If the amount of water stored in the water tank 51 is equal to or less than the preset amount, this may mean that the water tank 51 is empty (i.e., the water in the water tank 51 has been completely consumed during the previous beverage making steps). Accordingly, the controller C may display a notification to the user through the output unit O to fill the water tank 51 with water (S3). In this case, water in the water tank 51 may be entirely discharged to the water supply passage 55B by the water supply pump 52, and the inside of the water supply pump 52 may contain or be filled with air.

Thus, when the user fills the water tank 51 with water so water stored in the water tank 51 is greater than the preset amount, the controller C may open the air removing valve 92 (S4) (S5). When the air removing valve 92 is opened, air in the water supply pump 52 and the water supply channel 55B may be discharged through the air removing channel 91 and the air removing valve 92, and water may flow into the water supply pump 52 through the water ejection channel 55A by hydraulic pressure.

Thereafter, as described above, the controller C may close the air removing valve 92 (S6) when a preset or predetermined period of time has elapsed since the air removing valve 92 was opened (S5), and after the air removing valve 92 is closed, the controller C may turn on the water supply pump 52 (S7).

If the amount of water stored in the water tank 51 is greater than the preset amount, water remains in the water tank 51 and the water supply pump 52 may be filled with water. Therefore, the controller C may immediately turn on the water supply pump 52 without opening the air removing valve 92 (S7).

Referring to FIGS. 8-11, a beverage maker according to another embodiment may be the same as the above-described embodiment except for the configuration of the air removing module 9, and thus, descriptions of redundant contents will be omitted and differences will be mainly described. In FIGS. 8-11, an air removing module 9' may be connected to the water tank 51 instead of the water supply heater 53.

The air removing module 9' according to an embodiment may include an air removing channel 93 connected to the water ejection channel 55A and a cap or valve 94 to open and close the air removing channel 93. A connection portion or joint 90' of the water ejection channel 55A and the air removing channel 93 may be positioned below the water tank 51.

The air removing channel 93 may include a connection channel 93A connected to the water ejection channel 55A and a vertical channel 93B extending vertically from the connection channel 93A and opened and closed by the cap 94.

The connection channel 93A may be arranged substantially horizontally. At least a portion of the connection channel 93A may be positioned below the water tank 51. The connection channel 93A may guide air from the water ejection channel 55A to the vertical channel 93B.

The vertical channel 93B may extend upward from the connection channel 93A. At least a portion of the vertical channel 93B may be positioned behind the water tank 51. The vertical channel 93B may guide the air guided from the connection channel 93A to the cap 94.

The water tank 51 may have a channel fixing portion or bracket 51G to fix and/or position the vertical channel 91B. The channel fixing portion 51G may include a protrusion protruding outward from an outer circumference of the water tank 51 and a through hole formed at the protrusion to allow the vertical channel 91B to pass therethrough. Accordingly, the vertical channel 91B may be fixed in position and prevented from being shaken or vibrated.

The cap 94 may be provided at an upper end of the vertical channel 93B. The cap 94 may be lifted to an upper side by internal pressure of air flowing along the vertical channel 93B to open the vertical channel 93B. When air is present in the water supply pump 52 or when the water supply pump 52 is filled with air, the water in the water tank 51 may be supplied to an inside of the water supply pump 52 through the water ejection channel 55A by hydraulic pressure of water stored in the water tank 51, and air filling the water supply pump 52 may flow through the air removing channel 93 to push out the cap 94. The cap 94 may thus open the vertical channel 93B, and the air may be discharged out of the upper end of the vertical channel 93B.

When the water supply pump 52 is operated after the water supply pump 52 is filled with water, the water in the water ejection channel 55A is taken into the water supply pump 52, and the cap 94 may be adsorbed to the air removing channel 93. Accordingly, the air removing channel 93 may be closed by the cap 94 when the water supply pump 52 is operated. As a result, unlike the above-described embodiment, the controller C may not be involved in an operation of the air removing module 9, and thus, energy consumption of the beverage maker is reduced and control is simplified.

The beverage maker may further include a channel fixing body or frame 36 having a through hole 36A into the vertical channel 93B is inserted and/or fitted. The through hole 36A of the channel fixing body 36 may be formed in an up-down direction.

An upper end portion of the vertical channel 93B may be fitted into and fixed in the through hole 36A of the channel fixing body 36, and the cap 94 may be seated on an upper surface of the channel fixing body 36 to open and close the upper end of the vertical channel 93B.

The channel fixing body 36 may be included in the material feeder 3, and may further have a cap limiter (not shown) to prevent excessive lifting or opening of the cap 94. The cap limiter may restrict movement of the cap 94 with respect to the up-down direction to prevent the cap 94 from being completely released from the vertical channel 93B.

Embodiments disclosed herein may provide a beverage making apparatus or a beverage maker capable of smoothly supplying water through a water supply pump and ensuring performance reliability of a water supply pump by removing air in the water supply pump.

The beverage making apparatus may include a water supply pump positioned at a lower portion of a water tank and discharging water to a water supply channel, an air removing channel connected to the water supply channel, an air removing valve connected to the air removing channel, and a controller maintaining the water supply pump in an off state when the air removing valve is opened. Accordingly, when the air removing valve is opened, water from the water tank may flow into the water supply pump by hydraulic pressure, and air inside the water supply pump may be guided to the air removing channel and discharged to the opened air removing valve.

A beverage making apparatus may include a water tank storing water, a water supply pump provided at a lower portion of the water tank and intaking, receiving, or suctioning water from the water tank, a water supply channel connected to the water supply pump and guiding water discharged from the water supply pump, an air removing channel connected to the water supply channel, an air removing valve connected to the air removing channel, and a controller maintaining the water supply pump in an off state when the air removing valve is opened. The air removing channel may include a vertical channel extending in an up-down direction, and the air removing valve may be connected to the vertical channel.

The water tank may include a channel fixing portion or frame to fix or position the vertical channel. A connection portion or joint of the air removing channel and the water supply channel may be positioned at a lower portion of or below the water tank.

The controller may turn off the water supply pump if water stored in the water tank is equal to or less than a preset or predetermined amount, and may open the air removing valve if the water stored in the water tank is greater than the preset amount. The controller may close the air removing valve and turn on the water supply pump when a preset or predetermined period of time has elapsed since the air removing valve was opened.

The beverage making apparatus may further include a fermentation module or fermenter receiving water flowing into the water supply channel. The fermentation module may be spaced apart from the water tank and the air removing valve may be provided between the fermentation module and the water tank.

The beverage making apparatus may further include a main frame fastened to each of the fermentation module and the water tank and having an air removing valve mounted thereon.

A base may be positioned at a lower portion of or below the water tank and the water supply pump and a material feeder may be positioned above and spaced apart from the base. The material feeder may receive water flowing to the water supply channel, and the air removing valve may be between the base and the material feeder in an up-down direction.

A beverage making apparatus or beverage maker may include a water supply pump positioned at a lower portion of or below a water tank and intaking, receiving, or suctioning water from the water tank through a water tank water ejection channel or a water ejection channel, an air removing channel connected to the water tank water ejection channel, and a cap that opens and/or closes an upper end portion of the air removing channel. Accordingly, water from the water tank may flow into a water supply pump by hydraulic pressure, and air in the water supply pump may be guided to the air removing channel and may push out the cap so as to be discharged.

A beverage making apparatus or beverage maker may include a water tank storing water, a water supply pump provided at a lower portion the water tank and intaking, receiving, or suctioning the water from the water tank, a water tank water ejection channel or water ejection channel connecting the water tank to the water supply pump, an air removing channel connected to the water tank water ejection channel and including a vertical channel extending in an up-down direction; and a cap provided at an upper end portion of the vertical channel, opening the vertical channel when the water from the water tank flows into the water supply pump, and adsorbed to the vertical channel when the water supply pump is operated. The beverage maker may further include a channel fixing body or frame having a through hole into which the vertical channel is fitted, and the cap may be seated on an upper surface of the channel fixing body.

When the air removing valve is opened, water from the water tank may flow into the water supply pump by hydraulic pressure, and air in the water supply pump may be discharged to the air removing valve through the air removing channel. As a result, the amount of water to be supplied from the water supply pump is increased and reliability of the water supply pump may be improved as compared with a case where air is present in the water supply pump. In addition, since the air removing channel may include the vertical channel connected to the air removing valve, water entering the air removing channel from the water supplying channel may be minimized.

Further, since the controller may maintain the water supply pump in the off state when the air removing valve is opened, the water supply pump may be operated to prevent water from being discharged to the air removing channel and the air removing valve. The channel fixing portion of the water tank may prevent the air removing channel from shaking or vibrating.

When water stored in the water tank is equal to or less than the preset amount, the water pump is turned off, and if the water tank is filled with water afterward, the air removing valve is opened so that water in the water tank is entirely discharged, and when air is present in the water supply pump, the air may be removed again. Since the air removing valve is provided between the fermentation module and the water tank in the left-right direction and between the base and the material feeder in the up-down direction, the air removing valve may be safely protected. Since the air removing valve is mounted on the main frame, the air removing valve may be stably supported.

When water from the water tank flows into the water supply pump, the air inside the water supply pump may flow into the air removing channel and push the cap so as to be discharged from the air removing channel. Further, when the water supply pump is operated, the cap may be adsorbed to the air removing channel. Accordingly, the air inside the water supply pump may be easily controlled without any separate control. In addition, water may not be discharged through the air removing channel during an operation of the water supply pump. Since the vertical channel of the air removing channel may be fitted and fixed to the channel fixing body, shaking or vibration of the air removing channel may be prevented.

Although a few exemplary embodiments have been shown and described, it will be appreciated by those skilled in the art that changes may be made in these exemplary embodiments without departing from the principles and spirit of the disclosure, the range of which is defined in the appended claims and their equivalents.

Accordingly, the exemplary embodiments of the present disclosure are provided to explain the technical spirit of the present disclosure but not to limit such spirit. The scope of the technical spirit of the present disclosure is not limited by the exemplary embodiments. The scope of protection of the present invention should be interpreted by the claims below, and all technical spirits which are in the same scope would be interpreted as being included in the scope of right of the present invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker comprising:
a tank that stores liquid;
a pump provided below the tank to pump liquid from the tank;
a liquid channel connected to the pump and guiding liquid discharged from the pump;
a gas channel connected to the liquid channel and through which gas from the pump flows;
a heater that heats liquid in the liquid channel;
an air pump that injects air into the heated liquid;
a valve connected to the gas channel to discharge gas from the gas channel; and
a controller maintaining the pump in an off state when the valve is opened,
wherein the pump is located below a lower end of the tank,
wherein the valve is located above the pump, the heater, and the air pump, and the valve is located above the lower end of the tank,
wherein, while the pump is turned off, the controller opens the valve such that liquid from the tank flows down to the pump from the tank, and gas flows from the pump through the valve due to liquid from the tank flowing to the pump,
wherein, when the valve is opened for a predetermined period of time or more, the controller closes the valve, and
wherein the controller turns on the pump after the valve is closed.

2. The beverage maker of claim 1, wherein the gas channel includes a vertical channel extending in a vertical direction and connected to the valve.

3. The beverage maker of claim 2, wherein the tank includes a frame to support and position the vertical channel.

4. The beverage maker of claim 1, wherein a joint connecting the gas channel and the liquid channel is positioned below the tank.

5. The beverage maker of claim 1, wherein the controller turns off the pump if liquid stored in the tank is equal to or less than a predetermined amount.

6. The beverage maker of claim 1, wherein the controller opens the valve if the liquid stored in the tank is greater than a predetermined amount.

7. The beverage maker of claim 1, further comprising a fermenter that receives liquid from the liquid channel and that is spaced apart from the tank,
wherein the valve is positioned in a space between the fermenter and the tank.

8. The beverage maker of claim 7, further comprising a main frame coupled to each of the fermenter and the tank, wherein the valve is mounted on the main frame.

9. The beverage maker of claim 1, further comprising:
a base provided below the tank and the pump; and
a material supplier provided above and spaced apart from the base that receives liquid flowing in the liquid channel,
wherein the valve is provided between the base and the material supplier.

10. A beverage maker comprising:
a first tank that stores liquid;
a pump provided below the first tank to pump liquid from the first tank;
a liquid channel connected to the pump and guiding liquid discharged from the pump;
a gas channel connected to the liquid channel through which gas from the pump flows;
a valve connected to the gas channel to discharge gas from the gas channel;
a second tank that receives liquid from the liquid channel to form the beverage;
a temperature module that adjusts a temperature of liquid in the second tank, the temperature module including a compressor provided below the first tank; and
a controller configured to manage the pump and the valve,
wherein the pump is located below a lower end of the first tank,
wherein the valve is located above the pump, the compressor, and the lower end of the first tank,
wherein the valve is opened while the pump is turned off such that liquid from the tank flows to the pump due to hydraulic pressure, and gas flows from the pump to the valve due to liquid from the tank flowing to the pump,
wherein after the valve is opened for at least a predetermined period of time, the controller closes the valve and turns on the pump.

11. The beverage maker of claim 10, wherein the gas channel includes a vertical channel extending in a vertical direction and connected to the valve.

12. The beverage maker of claim 11, wherein the first tank includes a frame to support and position the vertical channel.

13. The beverage maker of claim 10, wherein a joint connecting the gas channel and the liquid channel is positioned below the first tank.

14. The beverage maker of claim 10, wherein the controller turns off the pump when less than a predetermined amount of liquid is stored in the first tank.

15. The beverage maker of claim 10, wherein the controller opens the valve when more than a predetermined amount of liquid is stored in the first tank.

16. The beverage maker of claim 10, wherein the valve is positioned in a space between the first tank and the second tank.

17. The beverage maker of claim 16, further comprising a main frame coupled to each of the first tank and the second tank, wherein the valve is mounted on the main frame.

18. The beverage maker of claim 10, further comprising:
a base provided below the first tank, the pump, and the second tank; and
a material supplier provided above and spaced apart from the base, the material supplier including
  a plurality of holders that store respective materials,
  inlets to receive to liquid flowing in the liquid channel, respectively, into the holders, and
  outlets to output, respectively, liquid from the holders that is mixed with the materials,
wherein the valve is provided between the base and the material supplier.

19. A beverage maker comprising:
a first tower including:
  a tank that stores liquid; and
  a pump provided below the tank to receive liquid from the tank;
a liquid channel that receives liquid discharged from the pump;
a gas channel connected to the liquid channel to receive gas in the liquid channel;
a valve that is connected to the gas channel and discharges gas when opened;
a second tower including a fermenter; and
a material supplier provided between the first tower and the second tower, the material supplier supplying an ingredient to liquid in the liquid channel liquid, and the fermenter receiving liquid containing the ingredient,
wherein the valve is positioned between the first tower and the second tower, below the material supplier, and higher than a lower end of the tank,
wherein, before the pump is turned on, the valve opens such that liquid from the tank flows to the pump without operation of the pump, and gas flows to the valve from the pump due to liquid from the tank flowing to the pump, and
wherein valve closes after being opened for at least a predetermined period of time, and the pump turns on after the valve closes.

20. The beverage maker of claim 19, wherein the material supplier includes:
  a plurality of holders that store respective materials,
  a plurality of inlets to receive to liquid flowing in the liquid channel, respectively, into the plurality of holders, and
  a plurality of outlets to output, respectively, liquid from the plurality of holders that is mixed with the materials.

* * * * *